Sept. 6, 1955     F. M. JOHNSON     2,717,130
FLEXIBLE BOAT COAMING
Filed March 3, 1953     2 Sheets-Sheet 1
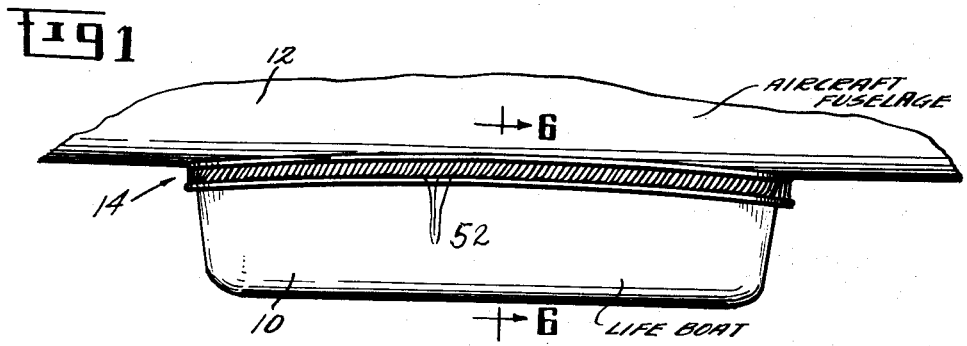
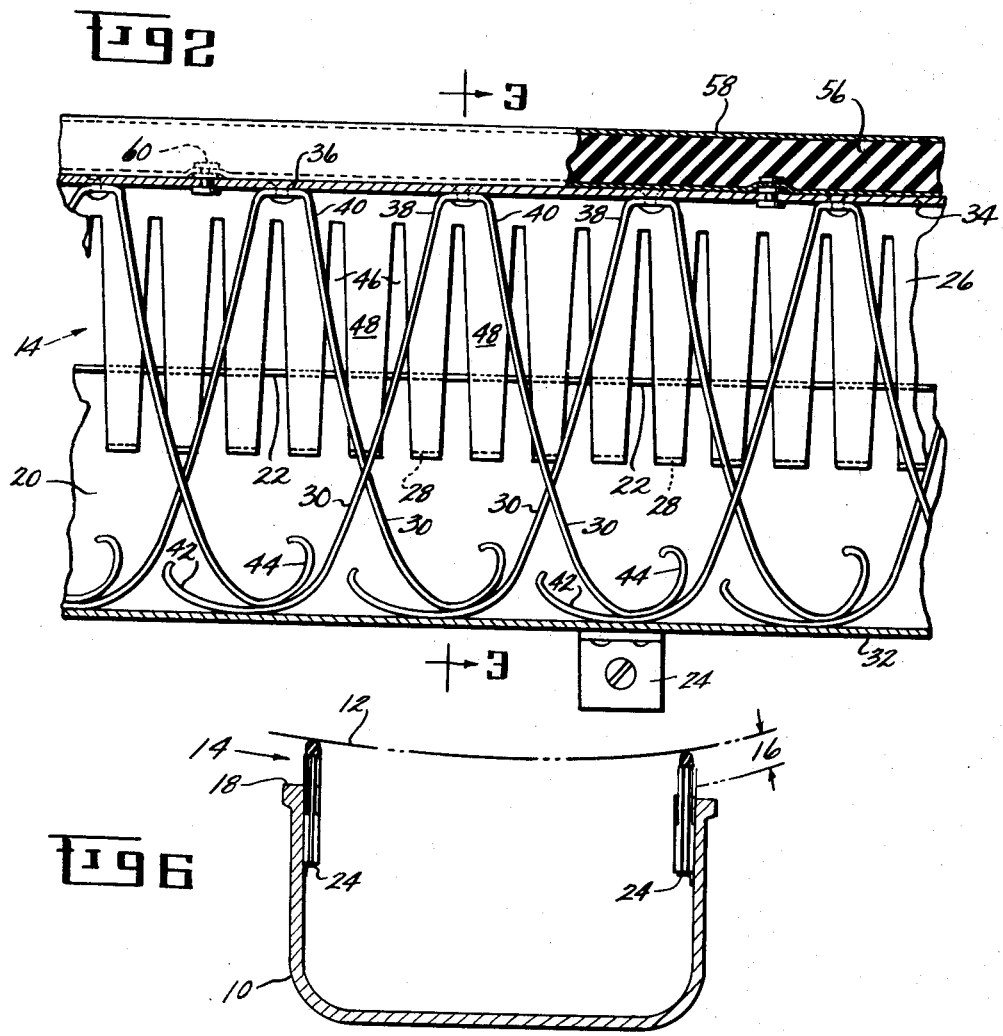
INVENTOR.
FRANCIS M. JOHNSON
BY Wade Koontz
Frederick W. Cotterman
ATTORNEYS

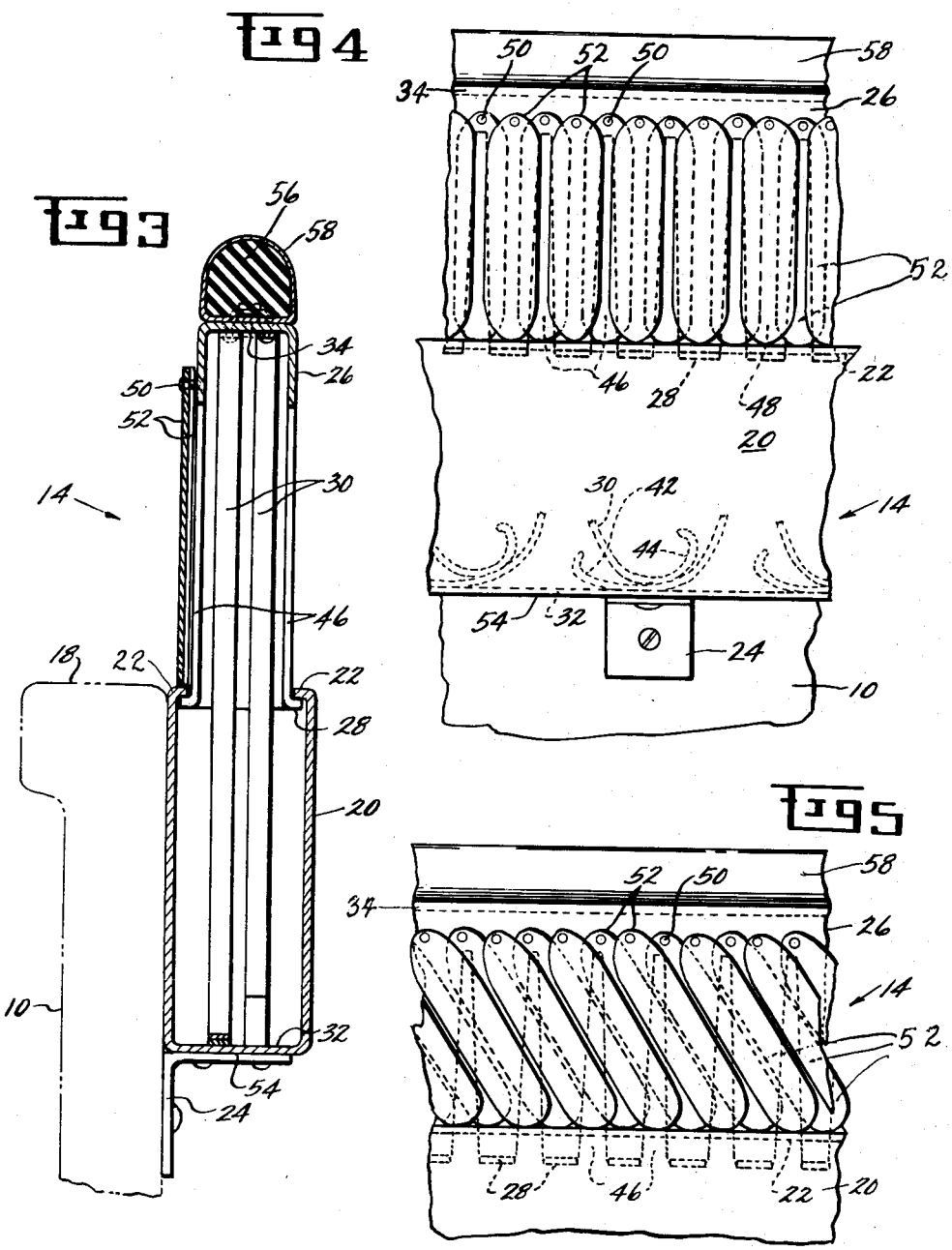

United States Patent Office 2,717,130
Patented Sept. 6, 1955

2,717,130

FLEXIBLE BOAT COAMING

Francis M. Johnson, Dayton, Ohio

Application March 3, 1953, Serial No. 340,171

7 Claims. (Cl. 244—2)

(Granted under Title 35, U. S. Code (1952), sec. 266)

The invention described herein may be manufactured and used by or for the United States Government for governmental purposes without payment to me of any royalty thereon.

This invention relates to a flexible lifeboat coaming and particularly to the coaming on lifeboats that are adapted for air to water delivery.

It is approved practice to carry a lifeboat on the underside of the fuselage of an aircraft, with the lifeboat drawn up to the underside of the aircraft as closely as possible pending arrival at the point of delivery where it is dropped by releasing means already known in the art.

Such an arrangement, however, to be successful requires that the opening in the top of the lifeboat, around which a coaming usually extends be of a contour substantially like that of the aircraft carrier in order to effect a seal at all points.

With such a requirement it is extremely unlikely that the opening in more than one lifeboat can be fully closed by the convex bottom of any one aircraft or vice versa.

It is therefore the prime object of this invention to provide a coaming for a lifeboat which is flexible and adjustable in height at such points of the coaming as is required to completely seal the space between the lifeboat and its carrier.

Other objects and advantages will be apparent as the invention is described in detail and reference is had to the drawing, wherein:

Fig. 1 is a fragmentary side elevational view of an aircraft with a lifeboat secured to its underside, the coaming strips having adjusted themselves individually to compensate for any unlikeness or variations between the contours of the lifeboat and its carrier.

Fig. 2 is a fragmentary vertical longitudinal sectional view of my flexible adjustable coaming which is to be affixed to the inner periphery of the opening or cockpit in the upper side of the lifeboat deck, parts being broken away and shown in section.

Fig. 3 is a transverse vertical section taken through the lifeboat coaming approximately on line 3—3 of Fig. 2.

Fig. 4 is a fragmentary side elevational view with cover plates pendulously pivoted at the upper end and adapted to assist in closing the slots in the side of the coaming, the upper portion of the extension springs being broken away.

Fig. 5 is a view similar to Fig. 4 but with the upper rail of the coaming depressed slightly and the pivoted cover plates swung to a different position to close the coaming slots, the extension springs being omitted from this figure.

Fig. 6 is a somewhat diagrammatic transverse section taken approximately on line 6—6 of Fig. 1 through the lifeboat when mounted on its carrier plane.

Like reference characters refer to like parts throughout the several views.

As may be seen in Fig. 1 of the drawing, a lifeboat 10 is attached to the underside of an aircraft 12 which may preferably be a B-29. A special coaming 14 lines the inner upper edge of the cockpit. The special coaming 14 is automatically adjustable vertically to compensate for variation in the height of the gap 16, Fig. 6, which may exist between the top edge 18 of the cockpit and the underside of the carrier plane 12.

The coaming 14 preferably extends completely around the upper edge 18 of the cockpit. In Figs. 2, 4 and 5 a fragmentary or short broken-off section only is shown. The special coaming 14, best seen in Fig. 2 and in enlarged cross section in Fig. 3, is constructed substantially as follows:

The case of channel member 20 of the special coaming 14 herein disclosed is of U shape in cross section, open at the top, with inturned top edges 22. A series of brackets 24 are fastened to the inner wall of the lifeboat and the case 22 is supported on these brackets and fastened thereto. The total length of the case 20 should preferably be sufficient to extend completely around the upper edge of the cockpit.

The flexible seal supporting member 26 is of inverted U shape in cross section with outturned bottom edges 28 (Fig. 3). The seal supporting member 26 is therefore slidable vertically in the case 20 but is limited in its upward sliding movement by the engagement of the outturned edges 28 of the seal supporting member 26 with the inturned edges 22 of the case 20.

Leaf springs 30 preferably formed from flat strips are provided and interposed between the bottom 32 of the case 20 and the top 34 of the seal supporting member 26, whereby the seal supporting member 26 is normally urged upward to its extreme extended position shown in Figs. 3 and 4.

The shape of the individual springs 30 is best seen in Fig. 2 where strips of sheet spring steel are bent into inverted U or V shapes to each provide a saddle 36 and two downwardly diverging legs 38 and 40, the lower ends of the legs being curved in fishhook fashion, the curved extremity 42 being of larger radius than the curved extremity 44. The saddles 36 are equally spaced apart and riveted or welded to the inner side of the top 34 of the seal supporting member 26. As shown in Fig. 3 there are two side-by-side rows of leaf springs 30 and these are connected at relatively staggered points as in Fig. 2. In Fig. 3, however, the springs 30 are shown at maximum extension while in Fig. 2 they are compressed vertically an amount equal to the distance between the inturned edges 22 and the outturned edges 28 in Fig. 2.

Upwardly tapering slots 46 are formed on the seal supporting member 26 as shown leaving tongues 48 depending downwardly between the slots thereby providing the necessary flexibility of the coaming to fit and adjust the contour of the upper edge of the coaming of the lifeboat with respect to the aircraft to which the lifeboat is attached.

Pivoted at 50 on the flexible coaming member 26 is a double row of overlapping slot covers 52, one row upon the other, and so spaced that, in their vertical position as shown in Figs. 3 and 4 they together cover the tapered slots 46.

When, however, there are inequalities in the height of the coaming 14, when the lifeboat is secured to the aircraft, and consequent yielding of the springs 30, the covers 52 will be arranged in the manner shown in Figs. 1 and 5, where the lower ends of the slot covers 52 rest on the inturned top edges 22 of the case 20 in Fig. 5, whereby they still cover the tapered slots 46 irrespective of the change in height of the coaming.

The seal 56 is made of sponge rubber or the like and is contained in a fabric casing 58. It extends the full length of the bottom 34 of the supporting member 26 and is secured thereto by fasteners 60. In attaching the lifeboat to the aircraft fuselage some detachable or release means is provided and suitable shackle connections are made to the interior of the lifeboat, fore and aft within the cockpit. The lifeboat is preferably released from within the aircraft and a parachute is provided for stabilizing and retarding its descent after its release in flight. As the lifeboat is elevated into its latch-on position the lower ends of the pivoted cover plates 52 are displaced laterally (as shown in Fig. 5). During further raising of the lifeboat into its "latch-on" position as shown in Fig. 1 the rounded ends of the pivoted plates will engage the upper inturned edge 22 and cam themselves into the inclined position as shown. The depression and adjustment of the upper flexible member 26 will cause the lower curved ends 42 and 44 of the overlapping spring arms of each group to slide over each other somewhat after the manner shown in Fig. 2. The cover plates will materially keep rain, snow, etc., from entering the interior of the lifeboat through the slots 46 while the lifeboat is being flown to its release destination. This prevents the boat from increasing in weight due to the collection of said moisture. Upon release of the boat from the aircraft the downward pressure on the cushion 56 is relieved and the spring members 30 will tend to straighten and extend the upper rail or flexible coaming member 26 upwardly until this movement is resisted by the engagement of the outturned ends 28 of the fingers 46 with the inturned edge 22 of the case or housing 20.

This extension of the coaming permits the cover plates 52 to gravitate again to vertical positions as shown in Figs. 3 and 4 and when the plates are in the vertical position provide positive supporting struts between the flexible member 26 and the casing or housing 20 and positively support the rail 58 vertically against collapsing, after the boat is released, and during subsequent rescue operations. The plates, of course, also materially keep water and spray from entering the boat after it has been deposited on the sea and during rescue work in adverse weather conditions.

While I have described my invention in connection with a specific embodiment as shown in the drawing, I do not wish to be limited to the precise details of construction as set forth, and therefore desire to avail myself of such variations and modifications as come within the scope of the appended claims.

I claim:

1. A coaming for a lifeboat which consists of a channel shaped lower rail open at the top and with inturned upper edges secured to the inside upper edge of said lifeboat, a channel shaped upper rail open at the bottom and with outturned lower edges and slidable vertically in the lower rail, said outturned edges acting as stops against said inturned edges to limit vertical movement of said upper rail, spring means within said channel rails urging said upper rail to its top position, a seal of soft rubber or the like secured to the top of the upper rail, vertical tapered slots in the sides of the upper rail to increase its bendability, and swinging slot covers pivotally supported on the upper rail and pendulously hung on the pivots in front of said slots to cover said slots.

2. A coaming for a lifeboat which comprises a lower rail fast to the lifeboat, an upper rail adjustable vertically on the lower rail, stops on said rails to limit adjustment, spring means within the rails urging maximum adjustment, slots in the upper rail to confer flexibility thereto, pendulous covers for said slots pivoted over said slots, said covers being in two rows one row upon the other and spaced so that the outer row covers the spaces in the inner row, the lower ends of the covers resting on the top edge of the lower rail and adapted to move to an angular position when the top rail is depressed with respect to the lower rail, and a soft cushion seal member on the upper edge of the upper rail.

3. Airplane-sea rescue equipment comprising an airplane having a fuselage, a lifeboat "bombed up" to the bottom of the fuselage in closely spaced relation thereto, said lifeboat having a cockpit, a flexible vertically yieldable boat coaming surrounding the top of the cockpit on the inner surface thereof for closing the space between the top of the cockpit and the bottom of the fuselage comprising, a channel shaped receiver fixed to the boat around the top of the cockpit below the top edge thereof, an adjustable flexible elongated closure member vertically slidable in said channel, extending substantially throughout the length thereof, projecting upwardly beyond the top edge of the cockpit toward the said fuselage, spring means confined between the base and side walls of the said channel shaped receiver and closure member urging said closure member vertically upward toward said fuselage, means between the said receiver and closure member limiting vertical upward movement of said closure member throughout its length toward said fuselage, and a yieldable elongated cushion member fixed on the top of said closure member, throughout its length, in contact with the bottom surface of the fuselage above the top edge of the cockpit, said flexible closure member and said cushion member forming a substantially continuous yieldable closure around the upper edge of the cockpit between the cockpit and the airplane fuselage for accommodating variations in the space surrounding the cockpit between the lower surface of the fuselage immediately above the top edge of the cockpit.

4. A vertically yieldable bendable metallic coaming forming a yieldable sealing closure around the top of a cockpit opening in a lifeboat arranged to be suspended in closely spaced relation below the bottom surface of a supporting aircraft to close the space between the top edge of the cockpit and the bottom surface of the aircraft, comprising an elongated deep U channel shaped receiver adapted to surround the top of the cockpit opening in the lifeboat in fixed relation thereto, below the top edge of the cockpit opening, said U channel shaped receiver having its upper longitudinal edges bent inwardly toward each other to form opposite stop shoulders, an inverted U-shaped elongated flexible resilient closure channel member mounted for vertical sliding movement in the channel shaped receiver between said stop shoulders having its opposite sides formed with uniformly spaced inverted V-shaped notches therein tapering upwardly from the lower edges of the side flanges of the closure channel member, terminating at points on the side flanges adjacent the base of the inverted U-shaped channel, to form downwardly tapering resilient leaf spring-like tongues uniformly spaced throughout its length in sliding engagement with the in-turned upper edges of the said receiver, said tapered tongues having their lower ends bent outwardly away from each other to form stop abutments for outward movement limiting engagement with the in-turned edges of the receiver, a plurality of V-shaped spring members interposed between the side walls of the said receiver and said closure channel member, retained therein between the bottoms of the U-shaped channel of the receiver and the inverted U-shaped channel of the closure member, said V-shaped spring means having their saddle portions fixed in uniformly spaced relation along the inner side of the base of the channel in one of the receiver and closure members with the free ends of the legs of the spring means curving outwardly and upwardly and disposed in overlapping sliding engagement with the other of the just mentioned bases, and an elongated flexible sealing cushion member fixed throughout its length on the outer surface of the upper end of the inverted U-channel-shaped closure member for sealing engagement with an uneven bottom surface of a supporting aircraft for the lifeboat.

5. A flexible coaming for a lifeboat comprising a channel-shaped lower rail open along its top edge and having in-turned upper edges, adapted to be secured around the inside of the upper edge of the lifeboat, a channel shaped flexible resilient upper closure rail open along its bottom having out-turned lower edges, and slidable vertically between the in-turned edges of the upper rail, said out-turned edges acting as stops for engagement with the in-turned edges to limit outward vertical movement of the upper rail in the lower rail, a cushion seal of soft rubber or the like secured along the top of the upper rail, said upper rail having its opposite sides formed with uniformly closely spaced upwardly tapering openings therein terminating adjacent the top of the upper rail, and a row of inverted V-shaped spring members, confined between the inner surfaces of the top and bottom of the upper and lower rails, having saddle portions secured in uniformly spaced relation along the inner surface of the top of the closure rail with the lower ends of adjacent spring members curving outwardly and upwardly in sliding superimposed relation in contact with the inside surface of the bottom of the lower rail for yieldably urging the upper rail upwardly relative to the lower rail throughout the length of the upper rail.

6. Apparatus as claimed in claim 5, in which the spring means includes two side-by-side rows of spring members with the springs in each of the rows disposed in staggered relation to the spring means in the other row.

7. Apparatus as claimed in claim 5, including a plurality of closure slot covers pivoted at their upper ends on the upper rail above the upper ends of the V notches therein, for movement in the plane of the upper end of the lower rail, and formed to gravitate to a vertical position with their lower ends in the path of movement between the rails when the upper rail is fully extended to prevent flexing and depression of the upper rail relative to the lower.

References Cited in the file of this patent

UNITED STATES PATENTS

| | | |
|---|---|---|
| 921,159 | Porter | May 11, 1909 |
| 1,048,407 | Godfrey | Dec. 24, 1912 |
| 1,754,211 | Hardin | Apr. 8, 1930 |
| 1,879,026 | Basham | Sept. 27, 1932 |

FOREIGN PATENTS

| | | |
|---|---|---|
| 136,889 | Sweden | Aug. 12, 1952 |
| 729,459 | Germany | Dec. 16, 1942 |